United States Patent [19]

Flohr et al.

[11] Patent Number: 6,044,125
[45] Date of Patent: Mar. 28, 2000

[54] METHOD FOR THE POST-PROCESSING OF A TOMOGRAM, AND COMPUTED TOMOGRAPHY APPARATUS OPERATING ACCORDING TO THE METHOD

[75] Inventors: Thomas Flohr, Uehlfeld; Arkadiusz Polacin, Erlangen; Juergen Wohlrab, Forchheim, all of Germany

[73] Assignee: Siemens Aktiengesellschaft, Munich, Germany

[21] Appl. No.: 09/137,225

[22] Filed: Aug. 20, 1998

[30] Foreign Application Priority Data

Aug. 20, 1997 [DE] Germany .......................... 197 36 242

[51] Int. Cl.[7] ....................................................... A62B 6/03
[52] U.S. Cl. ................................................... 378/4; 378/94
[58] Field of Search .......................... 378/4, 901; 382/131

[56] References Cited

U.S. PATENT DOCUMENTS 5,915,036  6/1999  Grunkin et al. ...................... 382/132

OTHER PUBLICATIONS

"Lexikonm der Computergrafik und bildverarbeitung," Iwainsky et al., 1994, pp. 235.

*Primary Examiner*—David V. Bruce
*Attorney, Agent, or Firm*—Hill & Simpson

[57] ABSTRACT

In a method for the post-processing of a tomogram, and a computed tomography apparatus operating according to this method, a universal computer is employed for post-processing of a reconstructed tomogram of a slice of an examination subject, the tomogram representing the entire field of measurement of the computed tomography apparatus or a segment of the field of measurement. The post-processing employs an adaptive ring suppression filter, in which the pixel values of a region comprising the entire tomogram or a part of the tomogram are subjected to, among other things, one or more median filterings, and an averaging, with the median filterings and the averaging take place along a number of directions of execution, and the calculation of the pixel values of the region takes place so that the pixel values of successive pixels in the each processing direction are calculated successively.

7 Claims, 14 Drawing Sheets

FIG 8
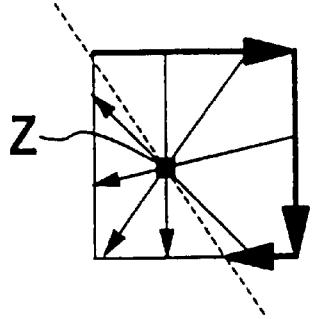
→ SELECTION SEQUENCE OF THE STARTING POINTS
→ RADIAL STRAIGHT LINE WITH PROCESSING DIRECTION IN THE DIRECTION OF THE ROTATIONAL CENTER Z
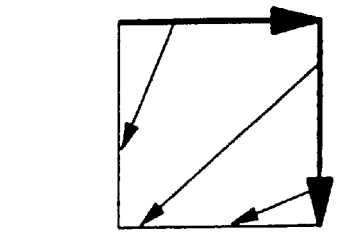
FIG 9
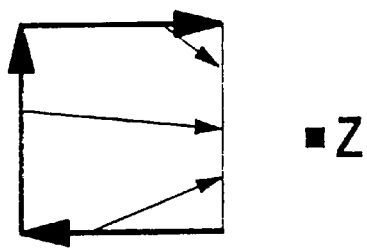
FIG 10

FIG 16
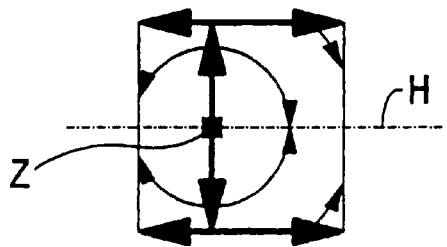
→ SELECTION SEQUENCE OF THE STARTING POINTS
→ CIRCULAR PATH WITH PROCESSING DIRECTION IN THE DIRECTION OF THE HORIZONTAL STRAIGHT LINES H THROUGH THE ROTATIONAL CENTER Z
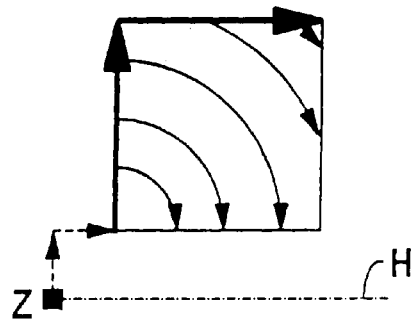
FIG 17
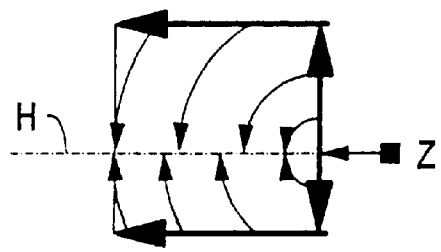
FIG 18

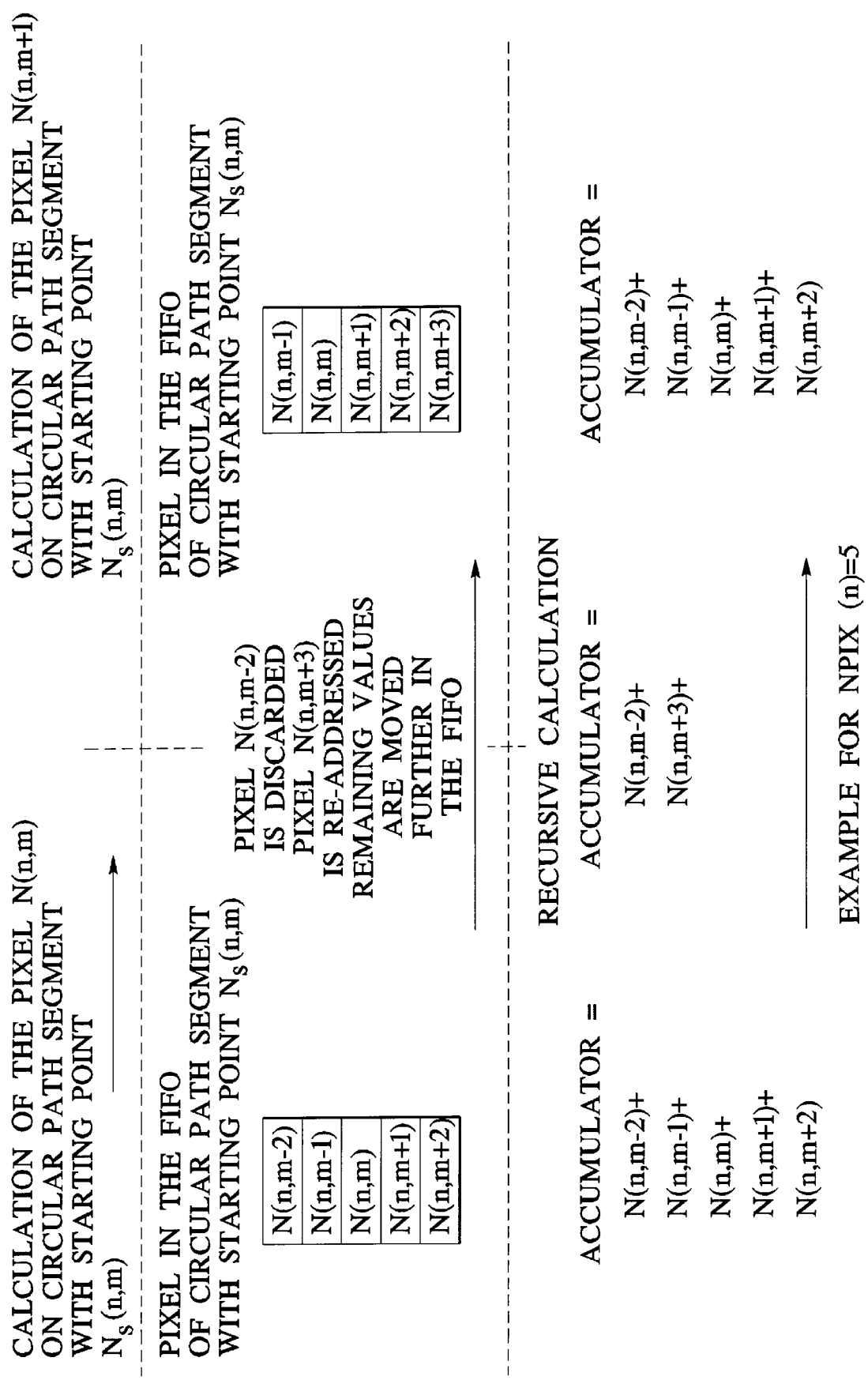

FIG. 24

RUN FROM THE FIRST STARTING POINT TO THE LAST STARTING POINT

PROCEED ALONG THE CIRCULAR PATH AS LONG AS THE PATH REMAINS LOCATED INSIDE THE TOMOGRAM OR THE REGION OF THE TOMOGRAM, AND THE HORIZONTAL STRAIGHT LINE H THROUGH THE CENTER OF ROTATION Z IS NOT CROSSED.

FOR EACH PIXEL WHICH IS PROCESSED, DETERMINE THE STEPS REQUIRED FOR THE AVERAGING ON CIRCULAR PATH SEGMENTS WITH THE OPENING ANGLE SPHI.

METHOD FOR THE POST-PROCESSING OF A TOMOGRAM, AND COMPUTED TOMOGRAPHY APPARATUS OPERATING ACCORDING TO THE METHOD

BACKGROUND OF THE INVENTION

1. Field of the Invention

The invention relates to a method for a computed tomography apparatus with a universal computer for the post-processing of a reconstructed tomogram of a slice of a subject of examination, which represents the entire field of measurement of the computed tomograph apparatus or a segment of the measurement field, based on an adaptive ring suppression filter.

2. Description of the Prior Art

Computed tomography is a standard technique in medicine, and is of great practical importance, e.g. for diagnosis. With a radiological measurement system including an X-ray detector system, which generally moves continuously around a subject of examination on a positioning table, or about the rotational center of the computed tomography apparatus, attenuation values of slices of the subject of examination are recorded at various angular positions of the measurement system relative to the subject. These attenuation values are subjected in a known way to image reconstruction, i.e., the reconstruction of tomograms of slices of, the tomograms being used, for example, for diagnosis.

The detector of the X-ray beam detector system generally contains a number of detector channels, e.g. 1024 detector channels. The detector channels thereby often have non-homogeneities with respect to their radiation sensitivity for X-ray radiation, resulting artefacts known as ring artefacts in the reconstructed tomograms, which are disturbing in the examination and evaluation of the tomograms.

For the suppression of these ring artefacts in the reconstructed tomograms, it is known to use a method in the form of an image post-processing. This method is called an adaptive ring suppression filter (ARU filter), and essentially comprises the following method steps for the post-processing of a tomogram:

a) Screening of bones and air out of the reconstructed tomogram, by limiting all pixel values of the tomogram matrix (designated INB in the following) to a predeterminable upper and lower threshold. This procedural step yields a new image matrix, designated KLB.

b) A first median filtering of the overall image matrix KLB along a multiplicity of straight lines running through the rotational center—in the slice plane—of the computed tomography apparatus, these lines covering the overall image matrix KLB in such a way that a straight line proceeds in the direction of the rotational center from each pixel of the edges of the image matrix KLB. The rotational center need not be located in the tomogram, the tomogram being only the portion of the slice plane shown in the image. The median filtering takes place on the basis of support points that can be predetermined on the straight lines according to image-specific parameters, which respectively represent a pixel value of the image matrix KLB. The pixel values obtained in this way are subtracted from the pixel values of the image matrix KLB, and the difference is subjected to a threshold value evaluation with a predeterminable threshold. The result of this procedural step is a new difference image matrix, designated UDB1.

c) In the region of the rotational center of the reconstructed tomogram, a second median filtering of a submatrix ensues—close to the rotational center—of the image matrices KLB and UDB1 along a number of straight lines proceeding through the rotational center of the computed tomography apparatus, which cover the overall submatrix in such a way that a straight line proceeds in the direction of the rotational center from each pixel of the edges of the submatrix. The median filtering again takes place on the basis of support points that can be predetermined on the straight lines according to image-specific parameters, which respectively represent a pixel value of the submatrix. The pixel values obtained in this way are subtracted from the pixel values of the image matrix KLB, and the difference is subjected to a threshold value evaluation with a predeterminable threshold. The sub-image matrix thus obtained, designated UDB2, is copied into the difference image matrix UDB1, resulting in the difference image matrix designated UDB.

d) Averaging of the pixel values of the difference image matrix UDB on circular arc segments proceeding in both directions from each pixel of the difference image matrix UDB, around the rotational center of the computed tomography apparatus with an opening angle SPHI/2, whereby the opening angle, designated SPHI, of the circular arc segments can be predetermined. The pixels are thereby grouped, according to their distance from the rotational center, into pixels in the inner region and pixels in the outer region of the difference image matrix UDB, in order to enable realization of different opening angles SPHI for the averaging in the inner and outer region.

e) Production of a resultant image in which the averaged pixel values of the difference image matrix UDB, which result from procedural step d), are subtracted from the tomogram matrix INB, and the pixel values obtained are limited to a value range [0,PIXMAX]. The resultant image matrix obtained in this way, designated OUTB, represents the post-processed tomogram with suppressed ring artefacts.

The ARU filter specified above thus in general subjects a reconstructed tomogram to two median filterings and an averaging, but the second median filtering can be omitted if the submatrix, close to the rotational center, of the second median filtering is located outside the represented tomogram. In addition, it is not necessary to median-filter and average the entire tomogram; rather, it is also possible to carry out median filtering and averaging only for regions of the tomogram.

A median filter as a special case of a value of range ordered filter for the suppression of impulse-type disturbances, as defined in lwainsky, Alfred and Wilhelmi, Wolfgang: Lexikon der Computergraphik und Bildnachverarbeitung, Braunschweig/Wiesbaden Friedr. Vieweg & Sohn Verlagsgesellschaft mbH, 1994, p. 235-, ISBN 3-528-05342-9.

The computing steps of the ARU filter, in particular those for median filtering and averaging, are carried out successively in line-by-line fashion for each pixel of the tomogram, without intermediate results of calculations of the neighboring pixels being usable. FIGS. 1 and 2 herein illustrate the line-by-line sequential procedure in the execution of the median filtering and the averaging of an image matrix (in the Cartesian grid) of a tomogram. On the basis of this procedure, in the calculations associated with the median filtering and the averaging, a high number of memory accesses to (retrievals of) the pixel values (in the Cartesian grid) of the tomogram are required, as are a high number of computing operations. In the computing steps of the ARU filter, the index determination of the required input data (pixel data) takes place in floating-point fashion, and the access to the input data (pixel values) located in the discrete Cartesian grid takes place by means of nearest-neighbor interpolation of the support points at the corresponding pixels. In the averaging on circular arcs, in order to conserve or limit computing time it is thus necessary to limit the averaging to a relatively small number of pixels, however, this has a detrimental effect on the quality of the suppression of the ring artefacts in the tomogram.

An improvement of the above-described method is to reinterpolate the input data of the ARU filter, which are present in the form of an image matrix of the tomogram in a Cartesian grid, into a polar grid with a constant increment of angle and radius. In the ARU filter, this enables a simple sequential access to the input data, since in the ARU filter filtering takes place in the radial direction and averaging takes place in the azimuthal direction (cf. FIGS. 3 and 4).

By means of the sequential memory access, the pixel values of the post-processed tomogram in the polar grid can now be calculated iteratively from the results of previously calculated pixel values. The intermediate results of calculations of the adjacent pixels are usable, so that a sharp reduction of the computing operations to be carried out and of the memory accesses to the input data in the calculation of a pixel value results. At the end of the calculation of the ARU filter, the output data are again reinterpolated onto a Cartesian grid before computing step e).

The disadvantage of this version of the method with the reinterpolation onto a polar grid with a constant increment of angle and radius is, however, the resolution of the polar grid that is required so that the original resolution of the input data is not lost in the reinterpolation from the Cartesian grid. In order to avoid having to accept any loss of resolution of the input data, the polar grid has to be defined in such a way that the constant increment of angle and radius at the tomogram pixel that is furthest away from the rotational center corresponds to the local resolution of the Cartesian grid. This has the consequence that the data set of input data has to be increased by an order of magnitude in the reinterpolation from the Cartesian grid to the polar grid, since image regions located closer to the rotational center are then scanned more finely than they were in the Cartesian grid. The consequence of the increase in the data set, required for reasons of resolution, is an increase of computing operations due to the increase in the number of pixels. This, however, counteracts the reduction in the computing operations achieved by means of the iterative calculations in the calculation of a pixel.

SUMMARY OF THE INVENTION

An object of the present invention is to provide a computed tomography apparatus of the type initially described, and a method for operating same wherein, for the median filterings and the averaging in the post-processing of a tomogram for the reduction of ring artefacts in the tomogram, the number of memory accesses and computing operations is reduced.

According to the invention, this object is achieved in a method for operating a computed tomography apparatus having a universal computer for the post-processing of a reconstructed tomogram of a slice of a subject of examination, the tomogram representing the overall field of measurement of the computer tomograph or a segment of the field of measurement, based on an adaptive ring suppression filter, in which the pixel values of a region comprising the entire tomogram or a part of the tomogram are subjected, among other things, to:

a) one or more median filterings, and
b) an averaging, wherein the median filterings and the averaging take place along a number of processing directions, and the calculation of the pixel values of the region takes place in such a way that the pixel values of successive pixels in the respective processing direction are calculated successively, or that the pixel values of pixels in the respective processing direction are calculated at least so as to take into account at least two pixel values of the respective processing direction that were already used for the preceding calculation.

In contrast to known methods, the calculations in the median filterings and the averaging of the pixel values of the region are not carried out sequentially in line-by-line fashion for each pixel; rather, the sequence of pixel processing is matched to the filter direction of the median filterings and to the direction of the averaging. In this way, the pixel values of the region can be calculated iteratively from the results, or from the intermediate results, of previously calculated pixels. The sequence of the processing of the pixel values of the image matrix of the region resembles, in the local sequence, the method with the polar grid, but the reinterpolation of the input data from a Cartesian grid to a polar grid is not required. In contrast to the method with the polar grid, despite proceeding in the processing direction in the median filtering or in the averaging, an image matrix of the region in the Cartesian grid is used, thus no increase of the quantity of input data for reasons of resolution is required. In the inventive method, the image matrix of the region in the Cartesian grid can be interpreted as a matrix in the polar grid, with variable increments of angle and radius.

In an embodiment of the invention, the selection sequence of the pixel values in the median filtering takes place along the radial straight lines through the rotational center—in the slice plane defined by the tomogram—of the computed tomography apparatus, which these lines covering the entire region and each containing two points of intersection with the edges of the region. This takes place with the following method steps:

a) Selecting the points of intersection of the radial straight lines on the edges of the region in such a way that a radial straight line proceeds in the direction of the rotational center from each pixel of the edges, b) Defining support points, each representing a pixel value, on the radial straight lines for the execution of the median filtering along radial straight lines, whereby the distance between the support points of a radial straight line can be predetermined, and whereby, in the case in which the spacing of the support points is greater than the pixel grid of the region, many executions of the median filtering, respectively offset by a pixel, are undertaken on the radial straight lines, so that each pixel intersected by the radial straight lines is median-filtered, and c) Executing the computing steps of the median filtering with the defined support points on the radial straight lines, proceeding from one point of intersection to the other point of intersection of each of the radial straight lines, i.e., up to the exiting of the radial straight lines from the region, whereby the pixel value that is adjacent to a defined support point is used as a calculation value for the median filtering.

The calculation of the median filtering of the ARU filter thus takes place according to the invention in the filter direction along radial straight lines through the center of rotation of the computed tomography apparatus, whereby it is advantageous that of M support points representing pixels, or the values thereof, for the median filtering of a pixel on a straight line, in general M−1 support points are already present from the calculation of the previous pixel located on the same straight line, and the pixel values of these M−1 support points are already sorted. For the median filtering of the corresponding pixel, it is thus required only that the next support point on the radial straight line be determined by incrementing the coordinates of the current support point by the spacing of the support points, and that the pixel belonging to this support point be determined, preferably, by nearest-neighbor interpolation on the discrete pixel grid. Subsequently, the pixel value of this support point for the median value determination is sorted into the sequence of pixel values of the existing support points, and the median value of the pixel values is determined and stored. The invention thus achieves a substantial savings, compared with the prior art, in computing steps and memory accesses to the input data, existing in the Cartesian grid, of the region.

In a further embodiment of the invention, the selection sequence of the pixel values in the averaging of the pixel values takes place along circular paths around the rotational center, which cover the entire region and which each have two endpoints, in the following steps:

a) Selection of the endpoints of the circular paths and determination of the radii R(n) of the circular paths, so that one endpoint is located on a straight line through the center of rotation, which line intersects the region and proceeds parallel to the pixel columns or pixel rows of the pixel grid of the region, or is located on an edge of the region, and the other endpoint is located on the same straight line, on a straight line that is at a right angle to this line and that proceeds through the rotational center, or is located on an edge of the region, with each pixel of the region being intersected at least once by a circular path, b) Determination of a number NPIX(n) of pixel values that is required for the averaging on circular path segments with an opening angle SPHI, c) Allocation of each pixel of the region to a respective circular path, with a pixel being allocated to a circular path with radius R(n) if the spacing of the pixel from the rotational center is located closer to the circular path with radius R(n) than to the adjacent circular paths with radii R(n+1), or R(n−1), and d) Execution of the computing steps of the averaging on circular path segments with an opening angle SPHI, going out from an endpoint of each circular path to the other endpoint of the circular path, located on a straight line through the center of rotation, this line proceeding parallel to the pixel columns or pixel rows of the pixel grid of the region and intersecting the region, or being located on an edge of the region.

The calculation of the averaging of the ARU filter thus takes place according to the invention in the direction of the averaging along circular paths about the rotational center of the computed tomography apparatus. It is advantageous that of NPIX(n) pixel values that are required for the averaging of a pixel value of a pixel on a circular arc segment with the opening angle SPHI of a circular path, in general NPIX(n)−1 pixel values are present from the calculation of the previous pixel value belonging to the same circular path, and these NPIX(n)−1 pixel values are already accumulated. Thus, only the next pixel on the circular path needs to be determined, and the pixel value thereof accumulated with the result of the previous calculation. At the same time, an "old" pixel can be discarded, and its pixel value can be subtracted from the accumulation value of the previous calculation, whereby the accumulation value obtained in this way has to be normed with the value 1/NPIX(n) before being stored. This inventive averaging embodiment thus also achieves a substantial savings in computing steps and memory accesses for the input data, existing in the Cartesian grid, of the region, in comparison with the prior art.

In a variant of the inventive method, an allocation of the circular paths to an inner region and to an outer region of the overall region on the basis of their radii R(n) is made, whereby the opening angle SPHI of the circular path segments for the execution of the averaging in the inner region is larger than the opening angle SPHI of the circular path regions in the outer region. In this way, different opening angles SPHI can be realized for the averaging in the inner region and outer region of the overall region, whereby the image quality of the post-processed tomogram is further increased.

In the computing steps of median filtering and averaging in the inventive method, the index determination of the required input data additionally takes place in floating-point fashion, and the memory access to the input data located in the discrete Cartesian grid preferably takes place by means of nearest-neighbor interpolation. For this reason, in the inventive calculation of the median filterings and the averaging the same precision is reached as in the prior art technique, but the time-consuming averaging need not be limited to a relatively low number of pixel values, so that the artefact correction is improved.

Since in the median filtering and the averaging according to the invention the intermediate results of calculations of the adjacent pixels are usable, a significant reduction of the computing operations to be carried out and of the memory accesses to the input data is achieved, the computing time of the inventive method being shortened considerably in comparison with the prior art.

In a computed tomography apparatus which, in the post-processing of a reconstructed tomogram of a slice of a subject of examination, (the tomogram representing the entire field of measurement of the computed tomography apparatus or a segment of the field of measurement, or represents a part of the region comprising the tomogram), employs a commercially available universal computer for this purpose that represents an economical computing and memory unit and that provides the required computing power.

According to a variant of the invention, the computed tomography apparatus has a multiprocessor system that executes in parallel fashion the inventive method for median filtering, or the inventive method for averaging, with the median filtering of the pixel values of the region taking place along several radial straight lines in parallel fashion, by means of various processors of the multiprocessor system, with the averaging of the pixel values of the region taking place along several circular paths in parallel fashion by means of various processors of the multiprocessor system. In this way, the computing time for the median filtering and for the averaging can be further reduced. This is of particular significance for the reconstruction in real time of ring artefact-free tomograms of slices of an examination subject.

DESCRIPTION OF THE DRAWINGS

FIGS. 8 to 13 respectively show examples for the determination of the starting points on the radial straight lines or edges of the tomogram according to the position of the rotational center in relation to the tomogram to be median-filtered in accordance with the invention.

FIGS. 16 to 21 respectively show examples for the determination of the starting points for the averaging along circular paths according to the position of the rotational center in relation to the tomogram in accordance with the invention.

FIG. 23 shows an example of an averaging over five pixel values of a circular path segment with the opening angle SPHI in accordance with the invention.

FIG. 24 represents the overall execution of the averaging on circular paths around the rotational center in accordance with the invention.

DESCRIPTION OF THE PREFERRED EMBODIMENTS

Figure 1:
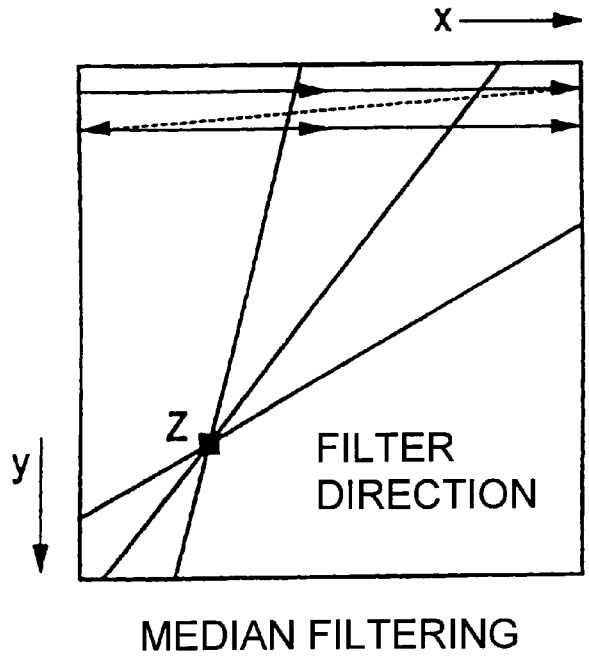
FIGS. 1 and 2, as noted above, schematically illustrate the conventional line-by-line sequential procedure in the calculation of the median filterings and the averaging of the pixel values of an image matrix (in the Cartesian grid) for a tomogram.
Figure 2:
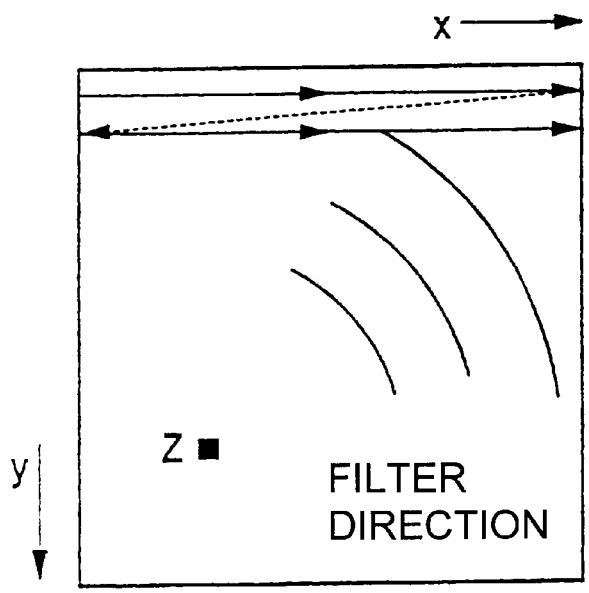
Figure 3:
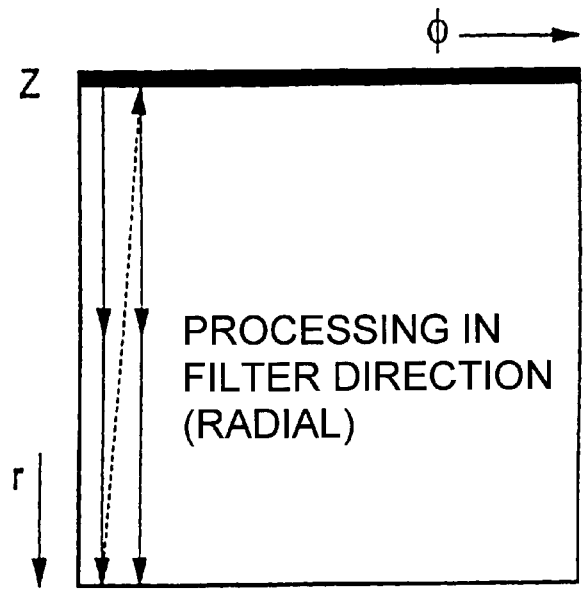
FIGS. 3 and 4, as noted above, schematically illustrate the conventional sequential procedure in the calculation of the median filterings and the averaging of pixel values of an image matrix (in the polar grid) for a tomogram.
Figure 4:
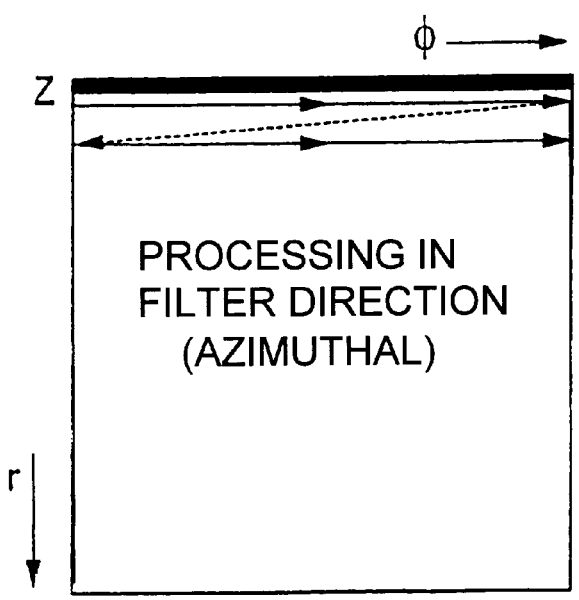
Figure 5:
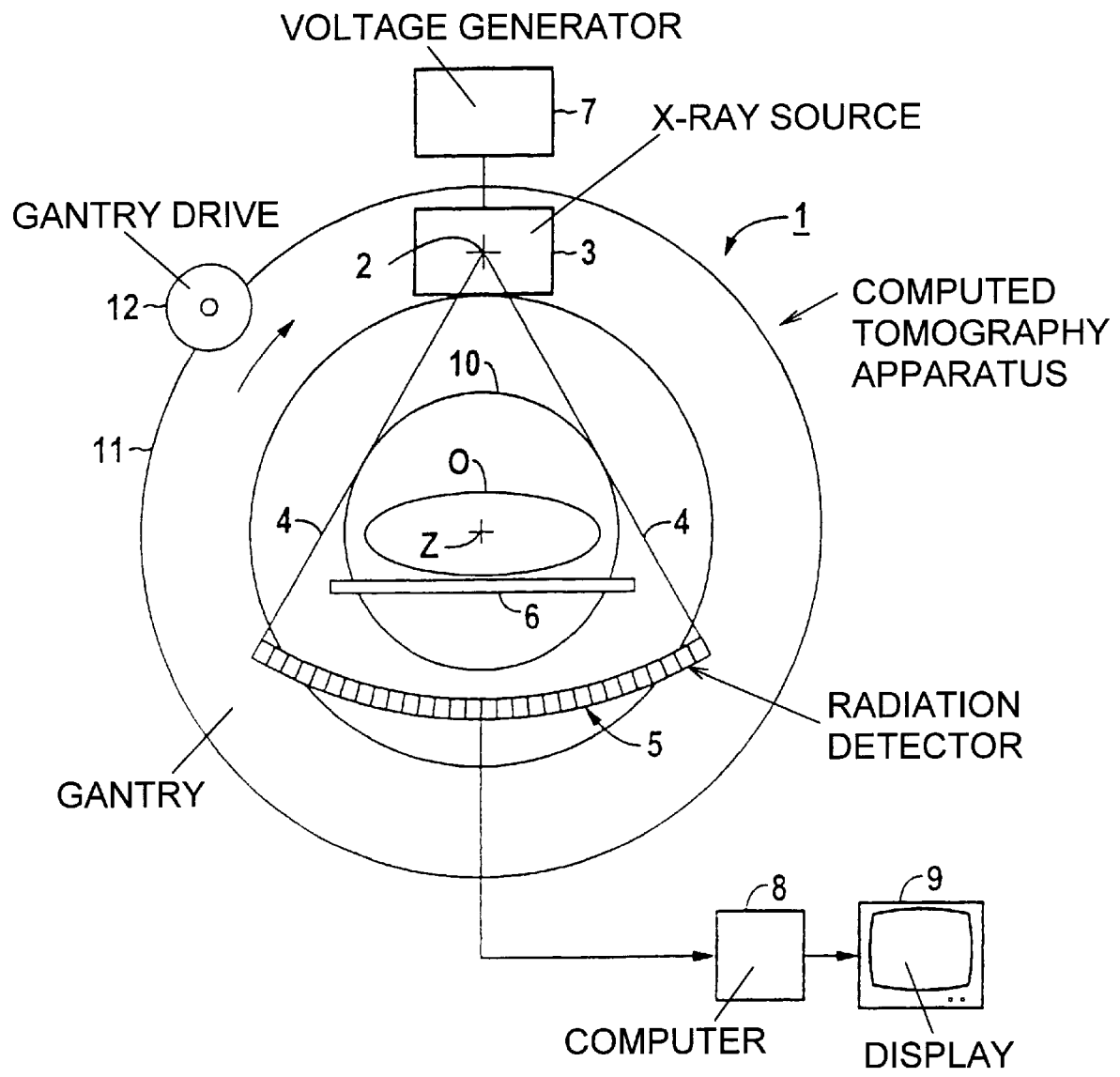
FIG. 5 is a schematic block diagram of a computed tomography apparatus constructed and operating in accordance with the invention.

FIG. 5 shows a computed tomography apparatus 1 with a universal computer 8 for the execution of the inventive method of the post-processing of a tomogram of a slice of an examination subject O, the tomogram being reconstructed from measured attenuation values. The computed tomography apparatus 1 has a measurement system including an X-ray source 3 that emits a fan-shaped X-ray beam 4 and a detector system 5 formed by a series of individual detector channels. The focus of the X-ray source 3 from which the X-ray beam 4 emanates is designated 2. The X-ray source 3 is fed by a voltage generator 7. The subject O to be examined is on a positioning table 6.

For the execution of a radiological examination of the subject O, the measurement system 3, 5 rotates, essentially in continuous fashion, around a measurement field 10, in which the subject O is located. For this purpose, a motor 12 drives a rotating gantry 11 to which the measurement system 3, 5 is fastened. The rotational center of the measurement field 10 (also of the computed tomography 1 apparatus is designated Z. During a radiological examination, in this way projections (attenuation profiles) of slices of the subject O are exposed from various angle positions of the measurement system 3, 5 relative to the subject O, and the associated data sets of measurement data (attenuation values) are supplied to the universal computer 8 by the detector system 5. The computer 8 reconstructs tomograms of slices of the subject O from the attenuation values, the tomograms being graphically reproduced on a monitor 9. The center of rotation Z, which is located in the slice plane, can be located in a tomogram, but need not necessarily be so located. Rather, the tomogram can represent an arbitrary segment, located in the slice plane, of the measurement field 10 of the computed tomography apparatus 1.

Due to inhomogeneities of the radiation sensitivity for X-ray radiation of the detector channels of the detector system 5, in the reconstructed tomograms of slices of the subject O, occur undesirable ring-shaped artefacts (ring artefacts) occur that are disturbing during image observation and evaluation. For the suppression of ring artefacts of this sort, reconstructed tomograms are subjected to image post-processing in the form of the adaptive ring suppression filter (ARU filter) described above.

In the following, only the method for median filtering and averaging of the ARU filter are examined in more detail, whereby in the case of the exemplary embodiment a region comprising an entire tomogram that represents a segment of the measurement field 10 of the computed tomography apparatus 1 is median-filtered or averaged.

Figure 6:
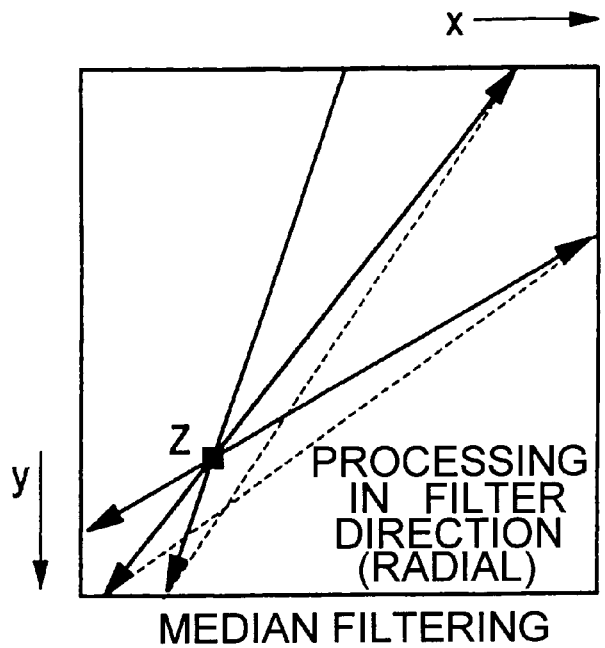
FIGS. 6 and 7 schematically illustrate the inventive procedure in the calculation of the median filterings of the pixel values along radial straight lines through the rotational center, and the averaging of the pixel values along circular paths about the center of rotation of an image matrix (in the Cartesian grid) of a tomogram in accordance with the invention.
Figure 7:
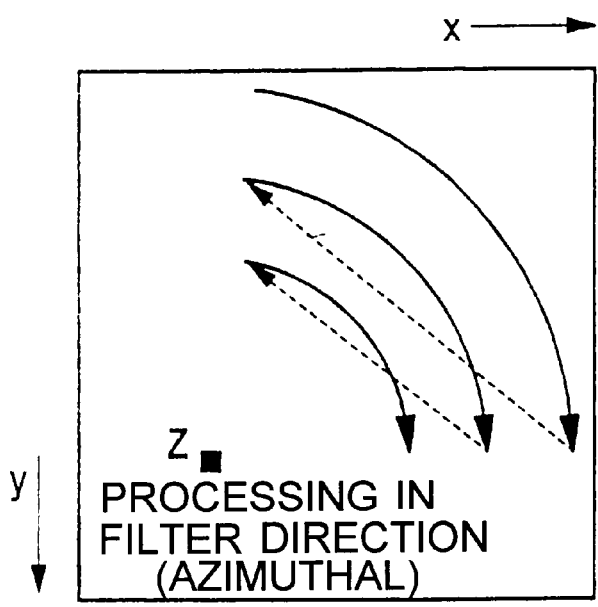
Figure 11:
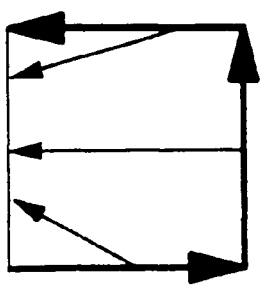
Figure 12:
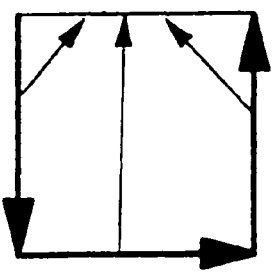
Figure 13:
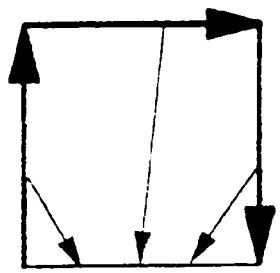

According to the invention, the calculation of the median filtering and of the averaging of the ARU filter does not take place in line-by-line sequential fashion for each pixel of the image matrix of the tomogram, but rather is conducted in the direction of the median filter, or in the direction of the averaging. FIGS. 6 and 7 illustrate the inventive procedure in the calculation of the median filtering, and the averaging of an image matrix (in the Cartesian grid) of a tomogram.

As shown in FIG. 6, the median filtering takes place respectively along radial straight lines through the rotational center Z of the computed tomography apparatus 1, which identify the locations of the filtering of the median filter and which each have two points of intersection with the edges of the tomogram. The points of intersection of the radial straight lines are respectively determined so that the entire tomogram to be median-filtered is covered by the radial straight lines, i.e., a radial straight line proceeds in the direction of the rotational center Z from each pixel of the edges of the image matrix of the tomogram. Dependent on the (predeterminable) processing direction of the median filtering along each of the radial straight lines, one of the two points of intersection of the radial straight lines with the edges of the tomogram is selected as a starting point for the median filtering on the radial straight lines. In the case of the present exemplary embodiment, the processing direction of the median filtering along the radial straight lines is always selected in the direction towards the rotational center Z. Thus, an initialization must be carried out for the determination of the starting points on the radial straight lines or edges of the tomogram, according to the position of the center of rotation Z in relation to the tomogram to be median-filtered. FIG. 8 shows a special case, in which the center of rotation Z is located inside the tomogram. In this case the processing direction of the median filtering necessarily takes place, at least initially, in the direction toward the center of rotation Z, and after passing through the center of rotation Z, it takes place in the direction away from the center of rotation Z. In this case, the starting points of the radial straight lines are located on three edges of the tomogram, whereby the points of intersection of an auxiliary line with the edges of the tomogram identify the starting points of the first and the last radial straight lines respectively. During the median filtering, each radial straight line is processed, proceeding from its starting point in the direction toward the center of rotation Z up to its second point of intersection with the edge of the tomogram, or up to the exit of the radial straight line from the tomogram (cf. FIG. 8, thin arrows). The radial straight lines are thereby preferably successively processed (cf. FIG. 8, thick arrows). FIGS. 9 to 13 show cases in which, according to the position of the center of rotation Z in relation to a tomogram, the starting points of the radial straight lines lie on two or three edges of the tomogram facing away from the center of rotation Z. During a median filtering, each straight line is then again processed, starting from its starting point on the edges of the tomogram, in the direction toward the center of rotation Z (cf. FIGS. 9 to 13, thin arrows). Here as well, the straight lines are preferably processed successively (cf. FIGS. 9 to 13, thick arrows).

Figure 14:
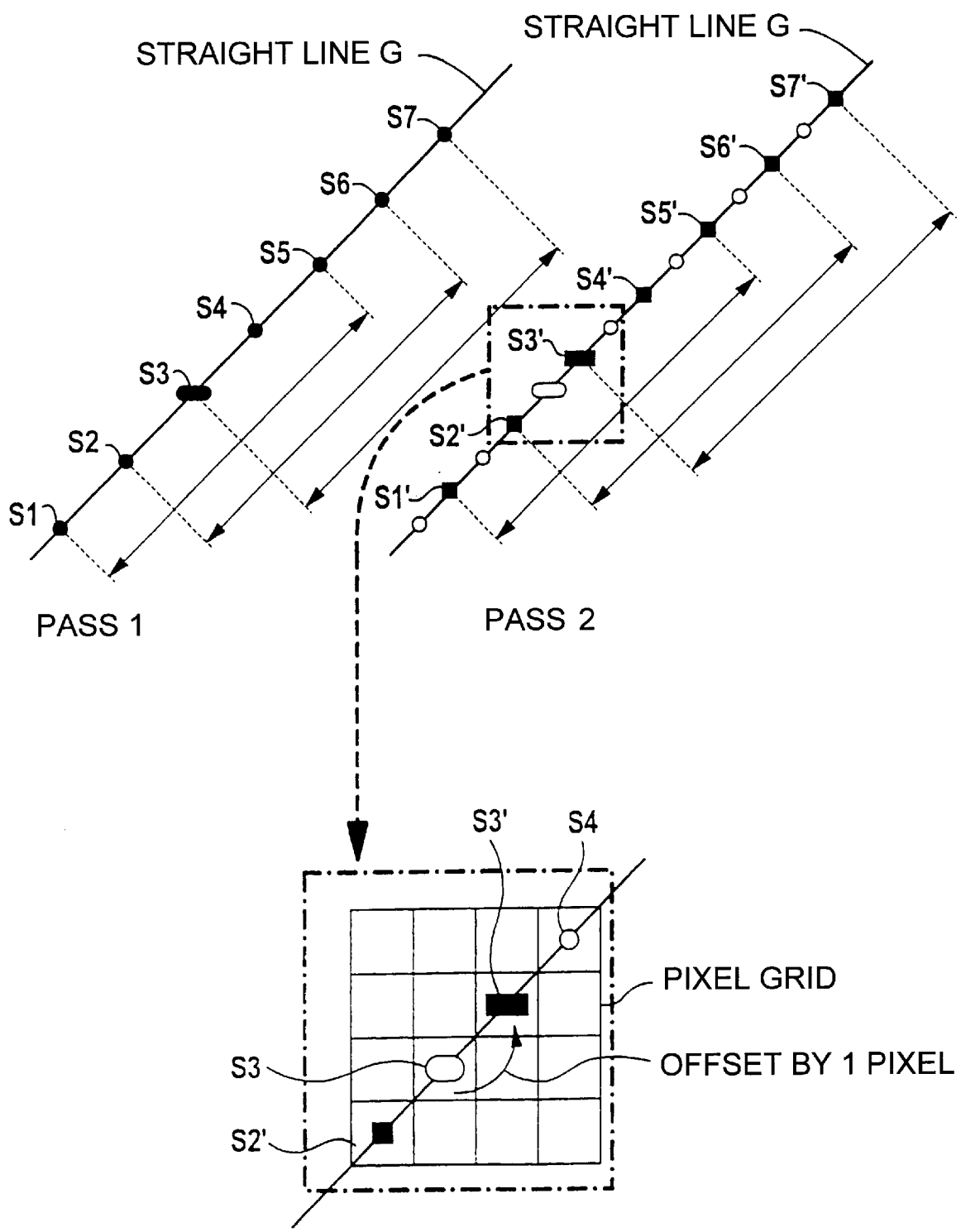
FIG. 14 shows the sequence of the median filtering if the distance of the support points from one another is greater than the discrete pixel grid of a tomogram in accordance with the invention.

After the determination of the processing direction of the median filtering and of the starting points of the radial straight lines, there ensues the determination of the support points, each representing a pixel value, on the straight lines, which are used for the actual calculation of the median filtering. The distance between the support points on the radial straight lines may be chosen freely, and as a rule is constant for all straight lines. The selection of the spacing of the support points from one another is dependent on image-specific parameters of the tomogram. The spacing of the support points on the radial straight lines for the median filtering can be larger than the pixel grid. In this case, however, in some circumstances pixels are skipped over during the median filtering on the radial straight lines, and thus the median filtering is not executed for these pixels. In order to prevent this, and to achieve a complete coverage of all pixels with support points, in the case in which the spacing of the support points is larger than the pixel grid additional executions of the median filtering, displaced by a pixel, are started on the radial straight lines so that each pixel of the tomogram is median-filtered. FIG. 14 shows an example of a median filtering with M=5 support points, in which the spacing of the support points on the radial straight lines G is twice the size of the pixel grid of the tomogram, so that for the median filtering of all pixels intersected by the straight line G an additional second execution of the median filtering, displaced by a pixel, is required. In principle, if the spacing of the support points in relation to the discrete pixel raster AR is greater than 1, nint(AR) executions of the median filtering with step width AR are required along the straight lines, whereby nint(x) is the smallest number that is greater than or equal to x. Per execution of a median filtering along the straight lines G, the computing steps of the median filtering are then to be executed for each support point S1 to S7, or S1' to S7'. It has proven to be advantageous that of the M support points that represent pixel values, for the median filtering of the next pixel on the straight line G, in general M−1 support points from the calculation of the previous pixel located on the same straight line G are already present, and the pixel values of these M−1 support points are already sorted. Thus, it is necessary to determine only the next support point on the radial straight line by incrementing the coordinates of the current support point by the spacing of the support points from one another, and to determine the pixel belonging to the support point, preferably by means of nearest-neighbor interpolation on the discrete pixel grid of the tomogram, and by sorting the pixel value thereof for the median value determination into the sequence of the existing pixel values of the support points. For example, for the determination of the median value of the pixel associated with the support point S3, the addressing of support points S1, S2, S3, S4, and S5 was necessary. Next, for the pixel associated with support point S4 the median value is to be determined. For this purpose, from the calculation of the previous pixel the pixel values belonging to the support points S2, S3, S4, and S5 are already present in sorted sequence (S1 was discarded). Thus, only the pixel belonging to support point S6 needs to be addressed, and the pixel value thereof needs to be sorted correspondingly.

For the rest, the starting point for the second execution of the median filtering on the straight line G results from the first execution, by displacing the first starting point by one pixel. FIG. 14 illustrates the transition from pass 1 of the median filtering to pass 2, offset by a pixel.

It can thus be seen that by means of the inventive embodiment of the median filtering, in the filter direction a substantial savings of computing steps and memory accesses to the input data of the image matrix (in the Cartesian grid) of the tomogram is possible in comparison with the prior art.

Figure 15:
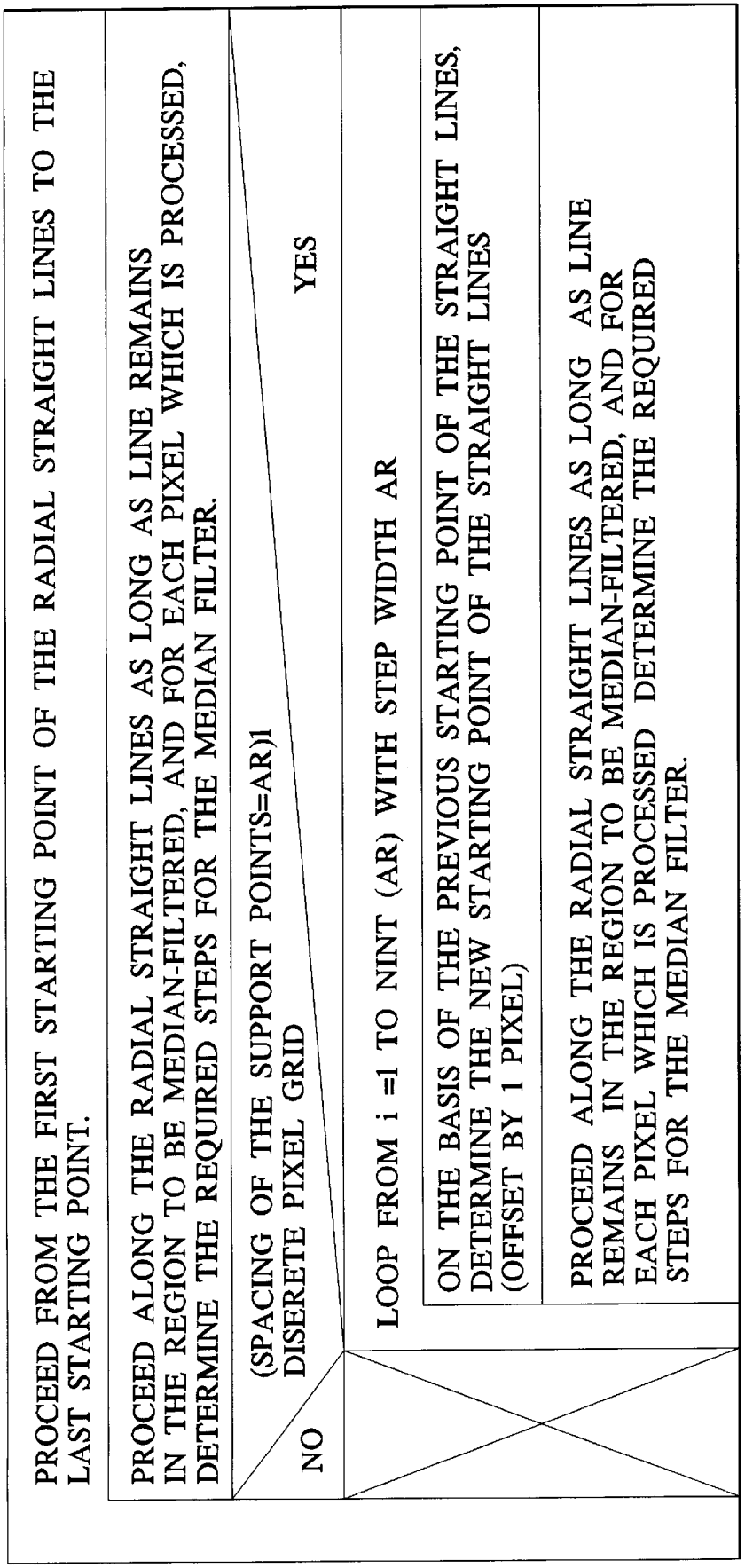
FIG. 15 represents the overall execution of the median filtering in accordance with the invention.
Figure 19:
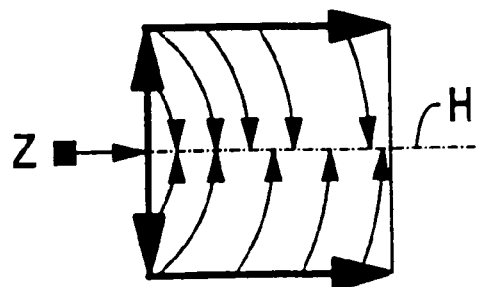
Figure 20:
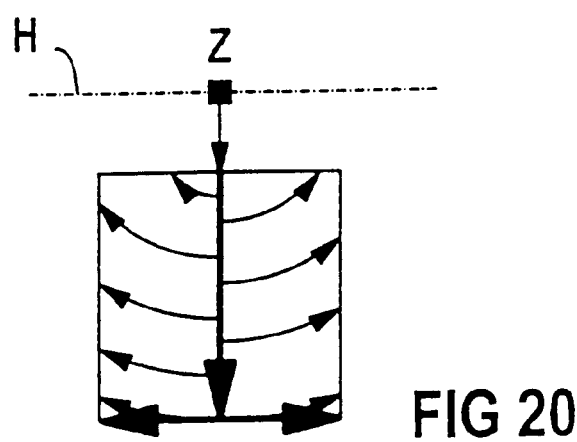
Figure 21:
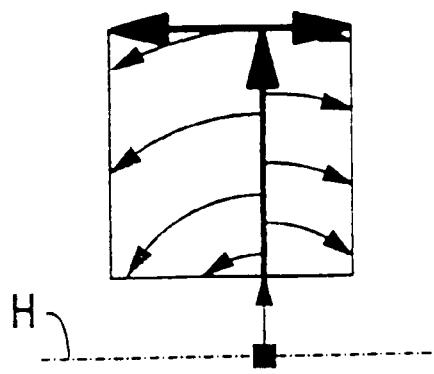

FIG. 15 illustrates and summarizes the overall execution of the median filtering along radial straight lines through the rotational center Z. The starting points of the radial straight lines are thereby preferably executed successively as far as possible, whereby, beginning from the starting points of the radial straight lines, the median filtering takes place along the radial straight lines as long as one is located in the tomogram, or region of the tomogram, that is to be median-filtered. If the spacing of the support points is selected larger than the discrete pixel grid of the tomogram (AR>1), executions of the median filtering displaced by a pixel must be started on the radial straight lines, with executions of the median filtering being carried out until each pixel intersected by the radial straight lines is median-filtered.

In addition, the median filtering of pixels located on a straight line and of successive pixels each belonging to a support point need not necessarily be executed successively as well; rather, the calculation of the median filtering on a radial straight line can take place in alternating fashion, using at least two pixel values that were already used for the preceding calculation of the median filtering and are thus present in the computing memory. In this way, the number of memory accesses and computing steps in the median filtering can indeed be reduced in comparison with the prior art, but the reduction is not optimal.

According to the invention, the averaging of the pixel values in the context of the post-processing takes place along circular paths about the rotational center Z of the computed tomography apparatus 1, which identify the locations of the averaging and which have two endpoints. The position of the endpoints and the radii R(n) of the circular paths are respectively determined so that the entire tomogram is covered by the circular paths, i.e., each pixel of the image matrix of the tomogram is intersected at least once by a circular path. Dependent on the (predeterminable) processing direction of the averaging on the circular paths, one of the two endpoints of the circular paths is selected as a starting point for the averaging. In the case of the present exemplary embodiment, the processing direction of the averaging is selected so that it always takes place in the direction towards a horizontal straight line H proceeding parallel to the pixel rows of the image matrix of the tomogram, through the rotational center Z (cf. FIG. 16, broken straight line). In the determination of the starting points of the averaging along the circular paths, an initialization must be carried out according to the position of the rotational center Z in relation to the tomogram. FIG. 16 shows the case in which the center of rotation Z is located inside the tomogram. In this case, the starting points of the circular paths are located on a straight line that proceeds through the center of rotation Z and that forms a right angle with the horizontal straight line H, and on the two edges of the tomogram that are intersected by these straight lines. From many starting points, it is thereby necessary in the averaging to start on two circular paths with the same radius, but with different directions relative to the horizontal straight line H. During the averaging, each circular path is then processed, starting from its starting point, in the direction towards the horizontal straight line H (cf. FIG. 16, thin arrows), as long as the path remains located inside the tomogram and the horizontal straight line H through the rotational center Z is not crossed. The individual circular paths are preferably processed successively, as far as possible (cf. FIG. 16, thick arrows). FIGS. 17 to 21 show cases in which, according to the position of the center of rotation Z in relation to the tomogram, the starting points are located on edges of the tomogram and on straight lines that proceed through the center of rotation Z, that stand at a right angle to the horizontal straight line H, and that intersect the tomogram. In these cases as well, during averaging the circular paths are preferably processed through successively as far as possible (cf. FIGS. 17 to 21, thick arrows), starting from their respective starting point, in the direction of the horizontal straight line H (cf. FIGS. 17 to 21, thin arrows).

After the determination of the radii R(n) and of the starting points of the circular paths, the circular paths are allocated (categorized) to an inner sub-region and to an outer sub-region of the tomogram (or tomogram region) on the basis of their radii R(n). In the averaging over various circular path segments with an opening angle SPHI, in the inner sub-region a larger opening angle SPHI of the circular path segments is selected than is the case in the outer sub-region. Subsequently, the determination of the number of pixel values required for the averaging on circular path segments while maintaining a certain opening angle SPHI takes place. The number of pixels NPIX(n) for a certain angle of opening SPHI on a circular path segment of a circular path with radius R(n) can be calculated by $$NPIX(n)=SPHI \cdot R(n)/RPIX$$

with RPIX being the discrete pixel grid and

SPHI being the opening angle in radians.

The number of pixels NPIX(n) must thereby necessarily be at least one.

For the execution of the averaging on circular paths, the pixels of the image matrix of the tomogram are subsequently allocated to circular paths, whereby, starting from a starting point pixel $N_s(n,m)$ of a circular path R(n) the adjacent pixels are sought whose spacing from the center of rotation Z is closer to the radius R(n) than to the radii of the adjacent circular paths R(n+1) or R(n−1). For this purpose, in general it is necessary to calculate, per pixel to be processed, the spacings from the rotational center Z of three pixels (from the current pixel in the processing direction), and to compare it respectively with two limits RMIN(n) and RMAX(n). The following thereby holds:

$$RMIN(n)=R(n)-RPIX/2 \text{ and}$$

$$RMAX(n)=R(n)+RPIX/2$$

with RPIX being the discrete pixel grid of the tomogram.

Figure 22:
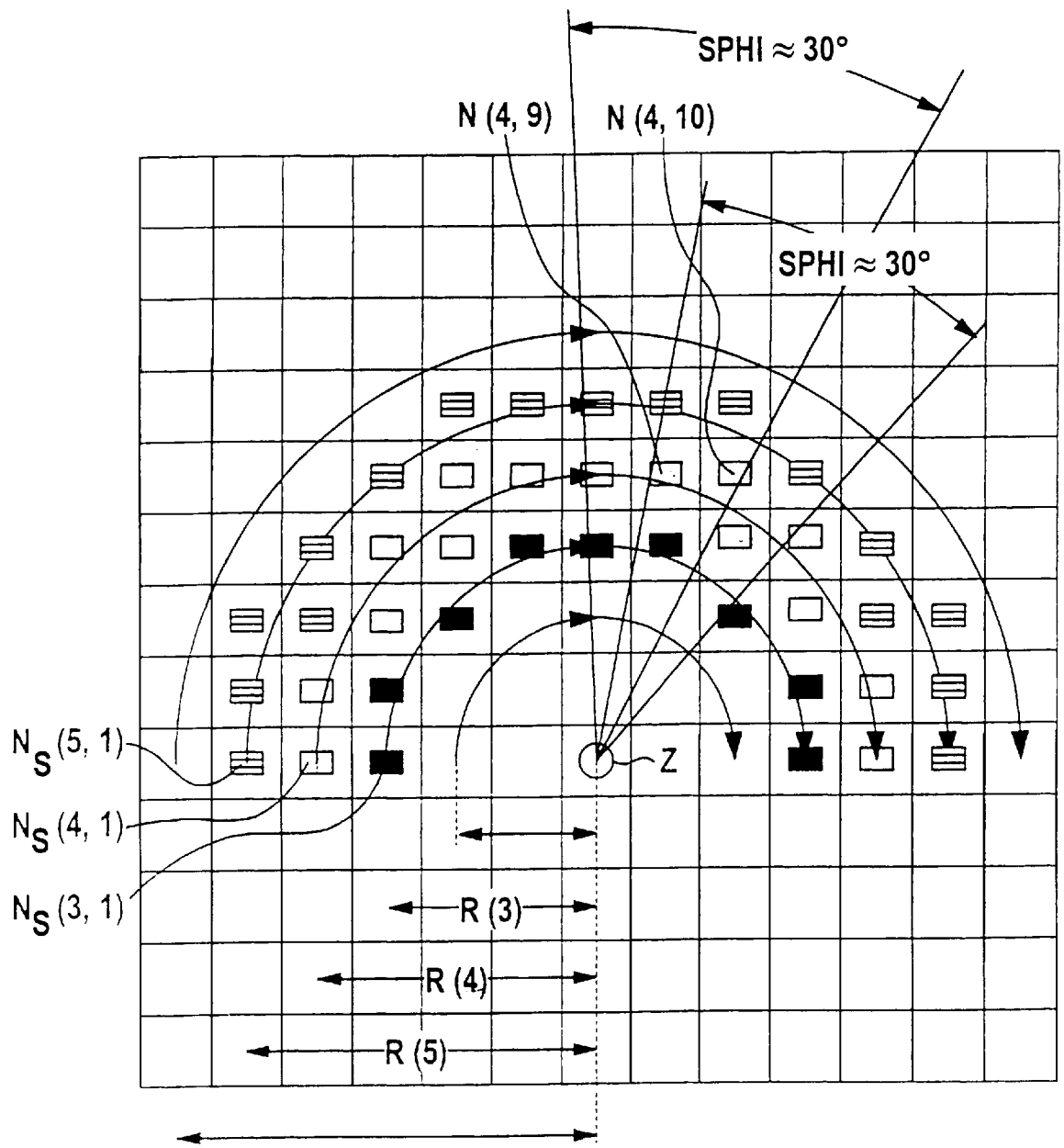
FIG. 22 shows the allocation of the pixels of a tomogram to circular paths with radii R(n), and the averaging of pixels of a circular path over circular path segments with an opening angle SPHI in accordance with the invention.

If the spacing of an adjacent pixel is located inside RMIN(n) or RMAX(n), the adjacent pixel is the next pixel on the circular arc with the starting point $N_s(n,m)$. FIG. 22 shows the allocation of pixels to circular paths with the radii R(3), R(4) and R(5) for the example of three circular paths with different starting points $N_s(3,1)$, $N_s(4,1)$ and $N_s(5,1)$.

After the allocation of the pixels to circular paths, there ensues the averaging on circular path segments with an opening angle SPHI, preferably as far as possible successively for each circular path, starting from an endpoint of the circular path that forms the starting point up to the other endpoint located on the horizontal straight line H, or located on an edge of the tomogram. Pixel values are averaged respectively via the determined number of NPIX(n) pixel values, which are to be accumulated for the averaging of a particular pixel N(n,m) on a circular path segment with the opening angle SPHI of a circular path with starting point $N_s(n,m)$. FIG. 22 shows an example of the averaging of the pixels N(4,9) and N(4,10) of the circular path with the radius R(4) over circular path segments with an opening angle of approx. 30°, whereby averaging respectively takes place over NPIX(4)=4 pixels. It has proven to be advantageous that of the NPIX(n) pixel values required for the averaging on a circular path segment with opening angle SPHI, in general NPIX(n)−1 pixel values are already present from the calculation of the previous pixel values belonging to the same circular path, and these NPIX(n)−1 pixel values are already accumulated. Only the next pixel on the circular path needs to be determined, and the pixel value thereof accumulated with the result of the previous calculation. At the same time, an "old" pixel can be discarded, and the pixel value thereof can be subtracted from the accumulation value of the previous calculation. The pixel value obtained in this way still has to be normed with the value 1/NPIX(n) before being stored.

FIG. 23 again shows an example of the execution of an averaging over NPIX(n)=5 pixel values of a circular arc segment with opening angle SPHI. For the determination of the average of the relevant pixel N(n,m), the addressing and accumulation of the pixels N(n,m−2), N(n,m−1), N(n,m), N(n,m+1) and N(n,m=2) was necessary. The determination of the average value for the next pixel on the circular arc segment N(n,m+1) is to be carried out subsequently. For this purpose, the pixel N(n,m+3) on the circular arc segment is addressed, and the pixel value thereof is added to the result of the averaging of the previous pixel N(n,m). At the same time, the pixel N(n,m−2) is discarded, and the pixel value of this pixel is subtracted from the result (accumulation) of the averaging of the previous pixel N(n,m). As a computing memory, a FIFO (first in first out) memory may be used, for example.

The inventive averaging yields a substantial savings of computing steps and memory accesses, and thereby reduces computing time. FIG. 24 and summarizes the entire execution of the averaging along circular paths about the center of rotation Z. Beginning from a first starting point of a circular path, all circular paths are preferably processed successively, as far as possible. In the processing of a circular path, as long as the path remains located inside the tomogram, or inside the region of the tomogram for which the average is to be formed, and the horizontal straight line H through the rotational center Z is not crossed, the required steps for the averaging are executed for each pixel which is processed.

Figure 25:
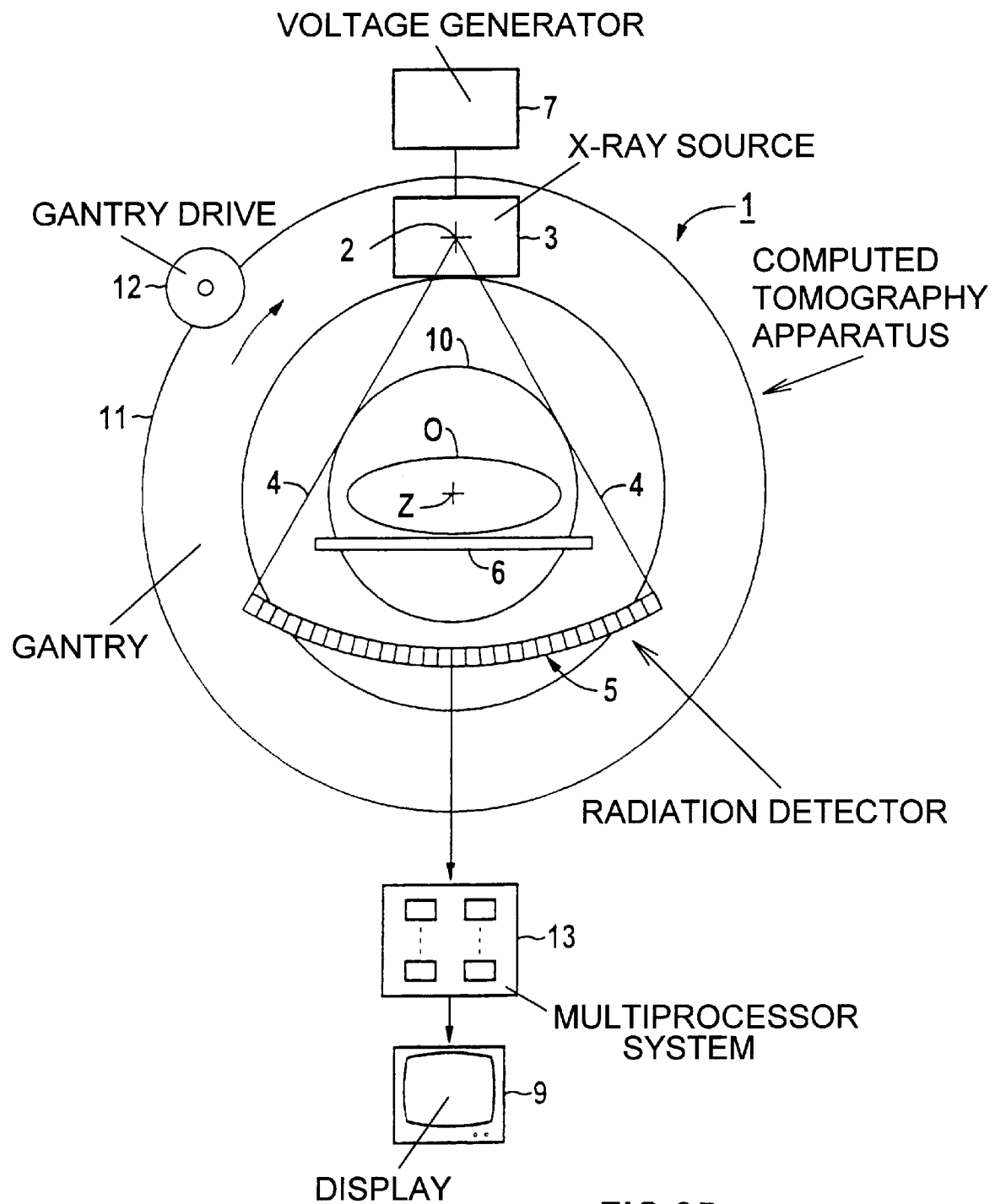
FIG. 25 is a schematic block diagram of a computed tomography apparatus with a multiprocessor system constructed and operated in accordance with the invention.

The computed tomography apparatus 1 can employ, instead of the universal computer 8 or in addition to the universal computer 8, a multiprocessor system 13, e.g. a transputer system with several transputers (cf. FIG. 25). In this way, it is possible to have different processors of the multiprocessor system 13 execute the median filtering along several radial straight lines, or to execute the averaging along several circular paths, in parallel fashion, i.e. simultaneously. Such a parallel division of the computing steps of the inventive method is unproblematically possible in a known way, taking into account the design criteria of the multiprocessor system which is used. A synchronization of the processors during the processing is possible, but is not absolutely required. The parallel processing of the median filtering or of the averaging leads to a further reduction of the computing time, both for the median filtering and for the averaging. This is of particular interest in the reconstruction of ring artefact-free tomograms of a slice of a subject O in real time.

The method described above is not limited to the post-processing of reconstructed tomograms of a body slice of a patient obtained on the basis of X-ray radiation; it can also be used for the image processing of any reconstructed tomograms that are subject to ring artefacts. Accordingly, the inventive computed tomography apparatus need not necessarily produce tomograms based on X-ray radiation.

The exemplary embodiment described above concerns the median filtering or averaging of an entire tomogram that represents a segment of the field of measurement of the computer tomograph, but it is also possible to carry out median filtering and averaging only of regions of such tomograms according to the inventive method. The median-filtered region or regions may differ completely from one another and from the averaged region, i.e., the regions need not necessarily be identical.

In addition, the tomogram to be post-processed need not represent only a segment of the field of measurement of the computed tomography apparatus; rather, it can represent the entire field of measurement of the computed tomography apparatus, whereby, again, a region comprising the entire tomogram or a part of the tomogram can be median-filtered and averaged.

Although various changes and modifications to the presently preferred embodiments described herein will be apparent to those skilled in the art, such changes and modifications can be made without departing from the spirit and scope of the present invention and without diminishing its attendant advantages. Therefore, the appended claims are intended to cover such changes and modifications.

We claim as our invention:

1. A method for operating a computed tomography apparatus having a computer means for post-processing of a reconstructed tomogram of a slice of an examination subject, said tomogram representing at least a segment of a field of measurement of the computed tomography apparatus, said post-processing employing an adaptive ring suppression filter in which the pixel values of at least a region of the tomogram are processed by the steps comprising:

at least one median filtering;

an averaging; and said median filtering and the averaging being conducted along a plurality of processing directions with the pixel values of the region being successively calculated from values of successive pixels in each processing direction, with each pixel value calculation employing at least two pixel values of the respective processing direction that were already used for a preceding calculation.

2. A method according to claim 1, wherein said plurality of processing directions in the median filtering comprises a plurality of radial straight lines each proceeding through a rotational center, located in a slice plane of the tomogram, of the computed tomography apparatus, said lines covering the entire region and each having two points of intersection with edges of the region, and wherein said method comprises the additional steps of:

selecting points of intersection of the radial straight lines with the edges of the region so that a radial straight line proceeds in a direction toward the rotational center from each pixel of the edges;

determining support points, each representing a pixel value, on the radial straight lines, for the median filtering along the radial straight lines, with a predetermining spacing between neighboring support points of a radial straight line, and if the spacing between neighboring support points is greater than a pixel grid of the region, conducting a plurality of median filtering executions, respectively offset by a pixel, along the radial straight lines, so that each pixel intersected by the radial straight lines is median-filtered; and conducting calculations for the median filtering using the support points on the radial straight lines proceeding from one point of intersection to a next point of intersection of each of the radial straight lines, up to an exit of the radial straight lines from the region, with a pixel value adjacent to one of said support points being used as a calculation value for the median filtering.

3. A method according to claim 1 wherein said plurality of processing directions in the averaging of the pixel values comprises a plurality of circular paths around a rotational center, located in a slice plane of the tomogram, of the computed tomography apparatus, said circular paths covering the entire region and each having two endpoints, and wherein said method comprises the additional steps of:

selecting the endpoints of the respective circular paths and determining radii R(n) of the respective circular paths so that a first of said endpoints is located on one of a straight line through the center of rotation that proceeds parallel to pixel columns or pixel rows of a pixel grid of the region and that intersects the region, or an edge of the region, and so that the second of said endpoints is located on one of the same straight line, a straight line disposed at a right angle to said straight line and proceeds through the rotational center, or an edge of the region, with each pixel of the region being intersected at least once by a circular path;

determining a number NPIX(n) of pixel values that is required for the averaging on circular path segments with an angle of opening SPHI;

allocating each pixel of the region to one of said circular paths, with a pixel being allocated to a circular path with a radius R(n) if a spacing of the pixel from the rotational center is located closer to the circular path with radius R(n) than to adjacent circular paths with radii R(n+1) or and R(n−1), respectively; and conducting calculations for the averaging on said circular path segments with said angle of opening SPHI, proceeding from said second endpoint of each circular path to said first endpoint of that circular path.

4. A method according to claim 3, comprising the additional step of allocating each of the circular to one of an inner sub-region or an outer sub-region of the region on the basis of their radii R(n), with the opening angle SPHI of the circular path segments for the averaging in the inner sub-region being greater than the opening angle SPHI of the circular path segments in the outer sub-region.

5. In a computed tomography apparatus having a computer means for post-processing, employing an adaptive ring suppression filter, of a reconstructed tomogram of a slice of an examination subject, said tomogram representing at least a segment of a field of measurement of the computed tomography apparatus, the improvement of said computer means comprising means for processing the pixel values of at least a region of the tomogram by at least one median filtering and an averaging, and for conducting said median filtering and the averaging along a plurality of processing directions with the pixel values of the region being successively calculated from pixel values of successive pixels in each processing direction, with each pixel value calculation employing at least two pixel values of the respective processing direction that were already used for a preceding calculation.

6. The improvement of claim 5 wherein said computer means comprises a multiprocessor system comprising a plurality of processors operating in parallel, for median filtering said pixel values along a plurality of radial straight lines, comprising said processing directions, simultaneously.

7. The improvement of claim 5 wherein said computer means comprises a multiprocessor system comprising a plurality of processors operating in parallel for averaging said pixel values along a plurality of circular paths, comprising said processing directions, simultaneously.

* * * * *